(12) United States Patent
Wang et al.

(10) Patent No.: US 8,205,305 B2  
(45) Date of Patent: Jun. 26, 2012

(54) HINGE MECHANISM

(75) Inventors: Jin-Xin Wang, Shenzhen (CN); Jian Li, Shenzhen (CN); Han-Zheng Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 6 days.

(21) Appl. No.: 12/963,902

(22) Filed: Dec. 9, 2010

(65) Prior Publication Data

US 2011/0271486 A1  Nov. 10, 2011

(30) Foreign Application Priority Data

May 10, 2010 (CN) ...................... 2010 2 0184433 U

(51) Int. Cl.
  *E05D 7/00* (2006.01)
(52) U.S. Cl. ........................................................ 16/354
(58) Field of Classification Search .................... 16/354, 16/366, 365, 368, 369, 370; 361/679.08, 361/679.11, 679.02, 679.15, 679.27; 455/90.3, 455/575.1, 575.3, 575.8; 379/433.12, 433.13; 348/373, 333.01, 333.06, 794

See application file for complete search history.

(56) References Cited

U.S. PATENT DOCUMENTS

| | | | |
|---|---|---|---|
| 6,519,812 B2 * | 2/2003 | Ko et al. | 16/354 |
| 7,870,644 B2 * | 1/2011 | Chang | 16/337 |
| 2006/0238970 A1 * | 10/2006 | Ukonaho et al. | 361/683 |
| 2007/0226955 A1 * | 10/2007 | Cho et al. | 16/354 |
| 2009/0013500 A1 * | 1/2009 | Ueyama et al. | 16/354 |
| 2009/0070961 A1 * | 3/2009 | Chung et al. | 16/354 |
| 2010/0037430 A1 * | 2/2010 | Wang et al. | 16/303 |
| 2011/0157780 A1 * | 6/2011 | Wang et al. | 361/679.01 |
| 2011/0265287 A1 * | 11/2011 | Li et al. | 16/297 |

* cited by examiner

*Primary Examiner* — Chuck Y. Mah  
(74) *Attorney, Agent, or Firm* — Altis Law Group, Inc.

(57) ABSTRACT

A hinge mechanism includes two pivoting shafts substantially parallel to each other, two main gears non-rotatably sleeved on the pivoting shafts, respectively. The hinge mechanism further includes two transmission gears positioned between the main gears, and two brackets sleeved on the pivoting shafts, respectively. Each transmission gear meshes with the other transmission gear and one main gear. Each pivoting shaft includes a flange which defines two locking portions, and each bracket forms two latching portions engaging with the locking portions of each pivoting shaft. The locking portions and the latching portions are selected from the structures of groove and hook.

20 Claims, 2 Drawing Sheets

HINGE MECHANISM

BACKGROUND

1. Technical Field

The present disclosure generally relates to hinges, and more particularly to a hinge mechanism applied in an electronic device.

2. Description of Related Art

There are many electronic devices that include hinged elements. To ensure that one part of the electronic device is capable of rotating relative to the other part thereof, a hinge mechanism applied in an electronic device often includes a first bracket, a second bracket, and two pivoting shafts. The first bracket and the second bracket are respectively sleeved on the pivoting shafts. The hinge mechanism further includes other elements, such as a plurality of friction members, resilient members, and fasteners sleeved on the pivoting shafts to provide axial force between the elements.

In use, the first bracket is rotated, and it drives one of the pivoting shafts to rotate relative to the other one of the pivoting shafts. Therefore, the two parts of the electronic device are capable of rotating relative to each other.

However, in order to open or close the electronic device, a user must exert continuous force on one part of the electronic device, and may take a relatively long time to open or close.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

The hinge mechanism as described in the embodiment as presented herein may be applied in any electronic device having two or more hinged parts, such as notebook computers, LCD monitors, and DVD (digital video disc) players.

Figure 1:
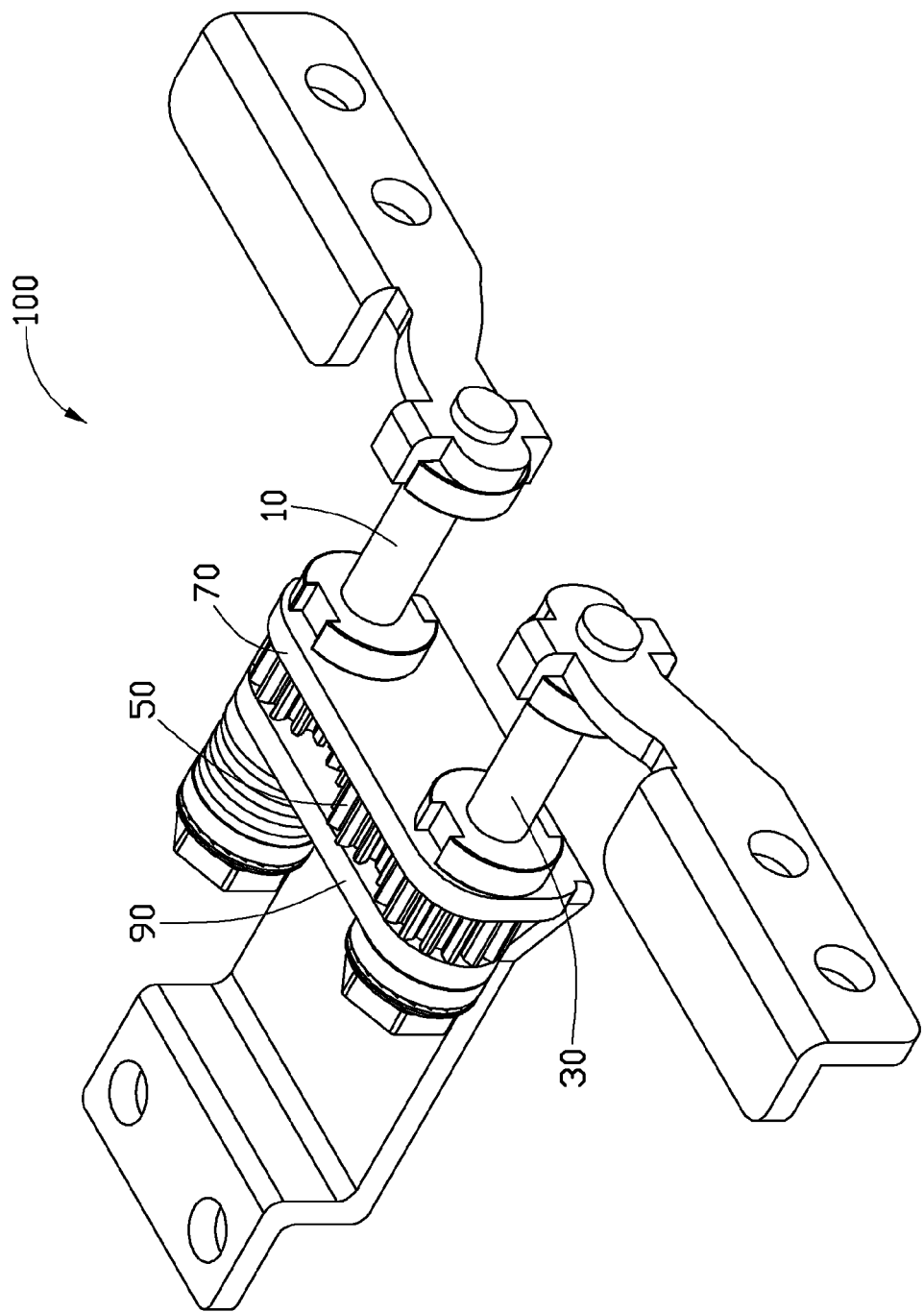
FIG. 1 is an assembled, isometric view of one embodiment of a hinge mechanism.
Figure 2:
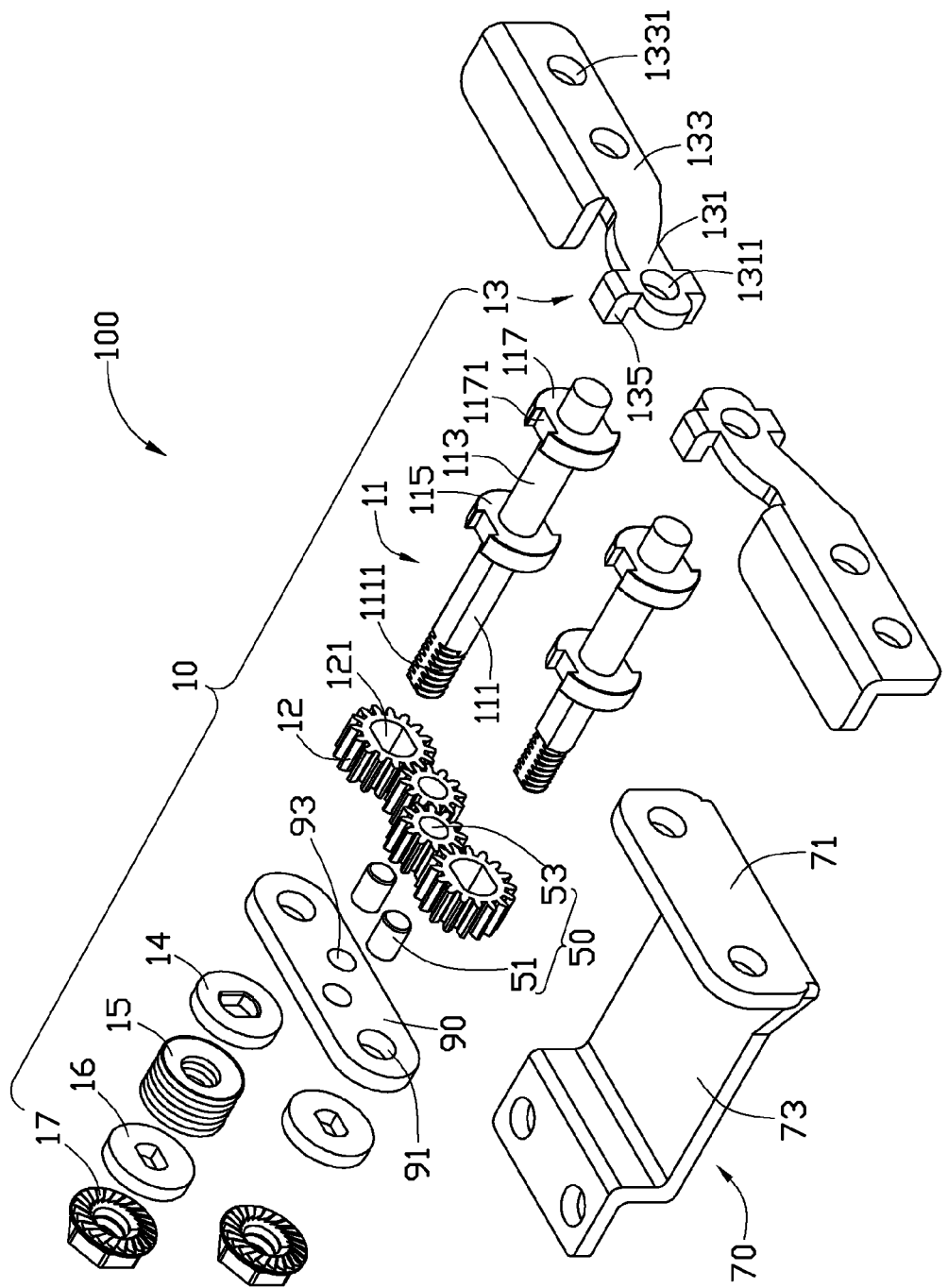
FIG. 2 is a partially exploded, isometric view of the hinge mechanism of FIG. 1.

Referring to FIGS. 1 and 2, a hinge mechanism 100 includes a first rotation assembly 10, a second rotation assembly 30 substantially parallel to the first rotation assembly 10, a transmission assembly 50, a first resisting member 70, and a second resisting member 90. The transmission assembly 50 is positioned between the first rotation assembly 10 and the second rotation assembly 30, and is held by the first resisting member 70 and the second resisting member 90.

The first rotation assembly 10 includes a pivoting shaft 11, and a main gear 12, a bracket 13, a friction member 14, a plurality of resilient members 15, a flat washer 16, and a fastener 17 sleeved on the pivoting shaft 11 in that order.

The pivoting shaft 11 includes a non-circular shaft portion 111, a circular shaft portion 113, a first flange 115 between the non-circular shaft portion 111 and the circular shaft portion 113, and a second flange 117 adjacent to one end of the circular shaft portion 113 and away from the non-circular shaft portion 111. The non-circular shaft portion 111 defines a threaded portion 1111 at a distal end thereof. The second flange 117 defines two locking portions 1171, which are separated by 180 degrees at a circumferential periphery of the second flange 117. In the illustrated embodiment, the locking portions 1171 are a plurality of grooves recessing from the circumferential periphery of the second flange 117. Alternatively, the second flange 117 may define one or more than two locking portions 1171 or form a plurality of hooks thereon.

The locking portions 1171 of the second flange 117 of the pivoting shaft 11 are shaped by a gear shaping machine (not shown), which reduces the production cost.

The main gear 12 defines a non-circular hole 121 therein.

The bracket 13 includes a pivotal portion 131, a connection portion 133, and at least one latching portion 135. The pivotal portion 131 is connected to the connection portion 133, and the at least one latching portion 135 is formed on the pivotal portion 131. The pivotal portion 131 defines a sleeve hole 1311 therein, the connection portion 133 defines two connection holes 1331 therein; and therefore, the bracket 13 is capable of being connected to one part of an electronic device (no shown). In the illustrated embodiment, the bracket 13 includes two latching portions 135, and the latching portions 135 are a plurality of hooks substantially perpendicularly protruding from and 180 degrees apart at the circumferential periphery of the pivotal portion 131. Alternatively, the bracket 13 may include one or more than two latching portions 135, and the latching portions 135 may be grooves recessing from the circumferential periphery of the pivotal portion 131.

Both the friction member 14 and the flat washer 16 define a plurality of non-circular holes corresponding to a profile of the non-circular shaft portion 111 of each pivoting shaft 11. In the illustrated embodiment, the resilient members 15 are a plurality of disk-shaped elastic washers resisting one another, and the fastener 17 is a screw nut. Alternatively, the first rotation assembly 10 may include a helical spring, an elastic sleeve, or other elastic members instead, and the fastener 17 may be a rivet penetrating the distal end of the pivoting shaft 11, and the pivoting shaft 11 may define a through hole adjacent to the distal end thereof.

The second rotation assembly 30 is similar to the first rotation assembly 10 but without the friction member 14 and the resilient members 15. Alternatively, the second rotation assembly 30 may have a same structure as the first rotation assembly 10.

The transmission assembly 50 includes two rotation shafts 51 and two transmission gears 53, and the transmission gears 53 are respectively sleeved on the rotation shafts 51.

The first resisting member 70 is a plate, which includes a resisting portion 71 and a fixing portion 73 extending from one edge of the resisting portion 71. In the illustrated embodiment, the fixing portion 73 is substantially perpendicular to the resisting portion 71.

The second resisting member 90 is a plate, which defines two pivot holes 91, and two shaft holes 93 positioned between the pivot holes 91.

During assembly of the hinge mechanism 100, the rotation shafts 51 of the transmission assembly 50 pass through the shaft holes 93 of the second resisting member 90, and the transmission gears 53 are respectively sleeved on the rotation shaft 51. The non-circular shaft portion 111 of the pivoting shaft 11 of the first rotation assembly 10 passes through the resisting portion 71 of the first resisting member 70, one main gear 12, one pivot hole 91 of the second resisting member 90, the friction member 14, the resilient members 15, the flat washer 16, and the fastener 17; the fastener 17 engages with the threaded portion 1111 of the pivoting shaft 11. Therefore, the first flange 115 resists the resisting portion 71 of the first resisting member 70. The other end of the pivoting shaft 11 adjacent to the second flange 117 passes through the sleeve hole 1311 of the pivotal portion 131 of the bracket 13, and the latching portions 135 engage with the locking portions 1171 of the second flange 117 of the pivoting shaft 11 by interference fit.

The second rotation assembly 30 is assembled to the transmission assembly 50, the first resisting member 70, and the second resisting member 90 in a same manner. The first resisting member 70 and the second resisting member 90 defines a receiving space (not shown) in which the transmission assembly 50, the main gear 12 of the first rotation assembly 10, and the main gear (not labeled) of the second rotation assembly 30 are received and held by the resisting portion 71 of the first resisting member 70 and the second resisting member 90.

When the hinge mechanism 100 is applied in an electronic device, an external force is exerted on one part of the electronic device to drive the first rotation assembly 10, for example, to rotate together with the side part of the electronic device. The transmission assembly 50 transmits the torque to the main gear of the second rotation assembly 30, thus that the main gear of the second rotation assembly 30 rotates in an opposite direction to the main gear 12 of the first rotation assembly 10. The second rotation assembly 30 transmits the torque to the bracket (not labeled) of the second rotation assembly 30 by the pivoting shaft (not labeled) of the second rotation assembly. Therefore, the two parts of the electronic device may be opened or closed at double-speed, and that it requires a user when using the electronic device to exert a force for a relatively shorter duration to open or close the electronic device.

In the hinge mechanism 100, the locking portions 1171 of the second flange 117 of the pivoting shaft 11 engage with the latching portions 135 of the bracket 13 with grooves and hooks, and therefore, the pivoting shaft 11 and the bracket 13 are non-rotatable relative to each other. Because the hooks are received in the grooves, which are capable of bearing a relative larger amount of torque than simply the engagement of the non-circular shaft and non-circular holes, as a result, the pivoting shaft 11 is more securely maintained to synchronously rotate with the bracket 13. Additionally, the pivoting shaft 11 and the bracket 13 are not easily damaged, and therefore the hinge mechanism 100 has a longer life-span.

The pivoting shaft 11 and the bracket 13 of the first rotation assembly 10 are engaged by interference fit, and the pivoting shaft and the bracket of the second rotation assembly 30 are engaged in a same manner, which further improves the engagement therebetween.

The locking portions 1171 of the second flange 117 of the pivoting shaft 11 are separated by 180 degrees at the circumferential periphery of the second flange 117, and the latching portions 135 are separated by 180 degrees at the circumferential periphery of the pivotal portion 131 of the bracket 13. Thereby, the torque is symmetrically divided to opposite sides of the pivoting shaft 11 and the bracket 13, and a stability of the first rotation assembly 10 is further improved. For the same reason, a stability of the second rotation assembly 30 is also further improved.

The transmission assembly 50, the main gear 12 of the first rotation assembly 10, and the main gear of the second rotation assembly 30 are received in the receiving space defined by the first resisting member 70 and the second resisting member 90. Thereby, the dust is prevented from entering the gaps between the gears, and the gears are capable of rotating more smoothly.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A hinge mechanism, comprising:
   two pivoting shafts substantially parallel to each other, and each pivoting shaft comprising at least one flange, wherein the at least one flange defines at least one locking portion at a circumferential periphery of the flange;
   two main gears non-rotatably sleeved on the pivoting shafts, respectively;
   two transmission gears positioned between the main gears, and each transmission gear meshing with the other transmission gear and one of the main gears; and
   two brackets sleeved on the pivoting shafts, respectively, and each bracket comprising at least one latching portion engaging with the at least one locking portion of each pivoting shaft, wherein the at least one locking portion and the at least one latching portion are selected from the structures of a groove and a hook respectively to engage with each other.

2. The hinge mechanism of claim 1, wherein the at least one locking portion of each pivoting shaft and the at least one latching portion of each bracket are engaged with each other by interference fit.

3. The hinge mechanism of claim 1, wherein the at least one locking portion is the groove, and the at least one latching portion is the hook engaging with the groove.

4. The hinge mechanism of claim 3, wherein the at least one locking portion recessing from the circumferential periphery of the flange of each pivoting shaft; each bracket comprises a connection portion and a pivotal portion, and at least one latching portion protruding from the pivotal portion of each bracket.

5. The hinge mechanism of claim 4, wherein each pivoting shaft comprises two locking portions, and each bracket comprises two latching portions correspondingly.

6. The hinge mechanism of claim 5, wherein the locking portions of the at least one flange of each pivoting shaft are separated by 180 degrees at the circumferential periphery of the at least one flange, and the latching portions of each bracket are separated by 180 degrees at the circumferential periphery of the pivotal portion.

7. The hinge mechanism of claim 4, wherein the at least one latching portion is substantially perpendicular to the pivotal portion of each bracket.

8. The hinge mechanism of claim 1, further comprising a first resisting member and a second resisting member, wherein the main gears and the transmission gears are held between the first resisting member and the second resisting member.

9. The hinge mechanism of claim 8, wherein the first resisting member comprises a resisting portion and a fixing portion extending from one edge of the resisting portion, and the first resisting member and the second resisting member cooperatively define a receiving space for the main gears and the transmission gears.

10. The hinge mechanism of claim 1, wherein each main gear defines a non-circular hole, and each pivoting shaft comprises a non-circular shaft portion passing through the non-circular hole of the main gear.

11. A hinge mechanism, comprising:
    two pivoting shafts substantially parallel to each other;
    two main gears non-rotatably sleeved on the pivoting shafts respectively;

two transmission gears positioned between the main gears, and each transmission gear meshing with the other transmission gear and one of the main gears; and two brackets sleeved on the pivoting shafts respectively;

wherein each pivoting shaft forms at least one hook or defines at least one groove, and each bracket defines at least one groove or at least one hook correspondingly to engaging with the at least one hook or the at least one groove of each pivoting shaft.

12. The hinge mechanism of claim 11, wherein the at least one hook and the at least on groove are engaged by interference fit.

13. The hinge mechanism of claim 11, wherein each pivoting shaft comprises at least one flange and the at least one flange defines said at least one groove or forms said at least one hook at circumferential periphery of the flange.

14. The hinge mechanism of claim 13, wherein the at least one flange of each pivoting shaft defines two grooves, and each bracket forms two hooks engaging with the grooves.

15. The hinge mechanism of claim 14, wherein each bracket comprises a connection portion and a pivotal portion, and the hooks protrude from the pivotal portion.

16. The hinge mechanism of claim 15, wherein the hooks are substantially perpendicular to the pivotal portion.

17. The hinge mechanism of claim 15, wherein the grooves are separated by 180 degrees at the circumferential periphery of the at least one flange of each pivoting shaft, and the hooks are separated by 180 degrees at the circumferential periphery of the pivotal portion of each bracket.

18. The hinge mechanism of claim 11, further comprising a first resisting member and a second resisting member, wherein the main gears and the transmission gears are held between the first resisting member and the second resisting member.

19. The hinge mechanism of claim 18, wherein the first resisting member comprises a resisting portion and a fixing portion extending from one edge of the resisting portion, and the first resisting member and the second resisting member cooperatively define a receiving space for the main gears and the transmission gears.

20. The hinge mechanism of claim 11, wherein each main gear defines a non-circular hole, and each pivoting shaft comprises a non-circular shaft portion passing through the non-circular hole of the main gear.

* * * * *